(12) United States Patent
Liu et al.

(10) Patent No.: US 7,334,294 B2
(45) Date of Patent: Feb. 26, 2008

(54) HINGE AND FOLDABLE ELECTRONIC DEVICE USING THE HINGE

(75) Inventors: Tai-Jun Liu, Shenzhen (CN); Rui-Hao Chen, Shenzhen (CN); Gang Yang, Shenzhen (CN); Shui-Yuan Qin, Shenzhen (CN); Hsiao-Hua Tu, Tu-Cheng (TW); Chia-Hua Chen, Tu-Cheng (TW)

(73) Assignees: Shenzhen Futaihong Precision Industrial Co., Ltd., BaoAn District, Shenzhen, Guangdong Province (CN); Sutech Trading Limited, Road Town, Tortola (VG)

( * ) Notice: Subject to any disclaimer, the term of this patent is extended or adjusted under 35 U.S.C. 154(b) by 169 days.

(21) Appl. No.: 11/136,787

(22) Filed: May 25, 2005

(65) Prior Publication Data

US 2006/0064849 A1 Mar. 30, 2006

(30) Foreign Application Priority Data

Sep. 24, 2004 (CN) .................. 2004 1 0051681

(51) Int. Cl.
*E05F 1/08* (2006.01)
*H04M 1/00* (2006.01)
*H04B 1/38* (2006.01)
*E05F 1/00* (2006.01)

(52) U.S. Cl. .................. 16/307; 16/307; 455/575.3

(58) Field of Classification Search ............... 16/306, 16/307, 304, 256, 242–245, 277, 338, 340, 16/379, 322, DIG. 41, 54; 361/681, 683, 361/803; 379/433.13, 433.11, 433, 428; 455/90, 550, 556, 575, 575.3
See application file for complete search history.

(56) References Cited

U.S. PATENT DOCUMENTS

| | | | | | |
|---|---|---|---|---|---|
| 2,015,988 | A | * | 10/1935 | Bommer et al. ............... | 16/54 |
| 2,127,327 | A | * | 8/1938 | De Millar ...................... | 16/54 |
| 5,205,015 | A | * | 4/1993 | Huang ............................ | 16/50 |
| 5,239,731 | A | * | 8/1993 | Lu ................................. | 16/340 |
| 6,018,847 | A | * | 2/2000 | Lu ................................. | 16/337 |
| 6,175,990 | B1 | * | 1/2001 | Kato et al. .................... | 16/334 |
| 6,321,415 | B1 | | 11/2001 | Frohlund | |
| 6,408,485 | B1 | * | 6/2002 | Wu ............................... | 16/342 |
| 6,453,509 | B1 | * | 9/2002 | Shin ............................. | 16/340 |
| 6,481,057 | B2 | * | 11/2002 | Lin ............................... | 16/340 |
| 6,568,034 | B2 | * | 5/2003 | Cho ............................. | 16/337 |

(Continued)

FOREIGN PATENT DOCUMENTS

CN 05263563 A * 10/1993
JP 06077670 A * 3/1994

*Primary Examiner*—Robert J. Sandy
(74) *Attorney, Agent, or Firm*—Morris Manning Martin LLP; Tim Tingkang Xia, Esq.

(57) ABSTRACT

A hinge (20) is for joining housings of a foldable electronic device together. The hinge includes an axle (22), a clip (220) at one end of the axle, a spring (24), and a block (26) at an opposite end of the axle. The axle has a screw thread (224) thereon. The block has a screw hole (262) therein. Through engagement of the screw thread in the screw hole, the block is retained on the axle. The spring is retained between the clip and the block. The structure of the hinge is stable, by reason of the connection provided by the axle between the clip and the block. The mobile phone using the hinge can reduce or eliminate damaging impact that would otherwise occur when the cover is opened up from the main housing and reaches an open state.

8 Claims, 4 Drawing Sheets

U.S. PATENT DOCUMENTS

| | | |
|---|---|---|
| 6,829,807 B2 * | 12/2004 | Kim .............................. 16/322 |
| 6,950,686 B2 * | 9/2005 | Won ........................ 455/575.3 |
| 7,100,239 B2 * | 9/2006 | Duan et al. ................... 16/303 |
| 7,117,563 B2 * | 10/2006 | Chen et al. .................... 16/330 |
| 7,124,472 B2 * | 10/2006 | Duan et al. ................... 16/303 |
| 2003/0172494 A1 * | 9/2003 | Oshima et al. ............... 16/285 |

* cited by examiner

HINGE AND FOLDABLE ELECTRONIC DEVICE USING THE HINGE

CROSS-REFERENCE TO RELATED APPLICATIONS

This application is related to U.S. patent application Ser. No. 11/012,945, entitled "HINGE ASSEMBLY" and filed on Dec. 14, 2004. The disclosure of the above identified application is incorporated herein by reference.

FIELD OF THE INVENTION

The present invention generally relates to a hinge for connecting two housings of a foldable, portable electronic device such as a foldable mobile phone, and in particular to a hinge which facilitates opening and closing of the device.

BACKGROUND OF THE INVENTION

With the development of the technologies of wireless communication and information processing, portable electronic devices such as foldable mobile phones are now in widespread use. These electronic devices enable consumers to enjoy the convenience of high-tech services anytime and anywhere. Foldable electronic devices are particularly favored by consumers for their convenience.

Foldable electronic devices generally have two housings joined by a type of hinge that allows the housings to fold upon one another. Many such foldable electronic devices have most of the electronics in one housing, called the main housing, and a few electronics in the other housing, called the cover. Other such foldable electronic devices have all the electronics in the main housing, with the cover serving only to cover a keypad and a display of the main housing. Manufacturers are constantly seeking to reduce the volume, size and weight of these foldable electronic devices. Thus, it is desirable that the hinge coupling the main housing with the cover is modularized and miniaturized. A common modularized hinge device has moving parts such as a cam member, a cam follower and a spring held together in a unified structure. The structure is easily and quickly attached to the main housing and the cover during mass production. A miniaturized hinge device has as few parts as possible, with the parts being as small as practicable.

Referring first to FIG. 3, U.S. Pat. No. 6,321,415 B1 describes a hinge 10 used to connect a main housing and a cover of a foldable mobile phone. The hinge 10 comprises a shaft 12 having a washer fixed on a first end thereof, a spring 14, a cam 16, and a follower 18. The spring 14, the cam 16 and the follower 18 are all axially mounted around the shaft 12 one by one. One end of the spring 14 is fixed to the cam 16. A long, axial knob 161 is formed on an outside of the cam 16, for fixing of the cam 16 to the main housing. An opposite second end of the shaft 12 is surrounded by the follower 18. A mounting cavity (not shown) is defined in the mobile phone, for mounting of the hinge 10 therein. A first hole (not shown) is also defined in the mobile phone at a first end of the cavity, so that the first end of the shaft 12 protrudes out of the first hole. A second hole (not shown) is defined in the mobile phone at an opposite second end of the cavity, so that the follower 18 is fixed in the cover and protrudes out from the second hole.

When the main housing and the cover of the mobile phone are in an open state, the spring 14 has an original length, and an end surface of the cam 16 and an end surface of the follower 18 cooperate with each other compactly. When the cover is rotated toward a closed state of the mobile phone, the follower 18 makes the cam 16 rotate. The spring 14 is twisted and acquires elastic potential energy, and finally the cover is locked at the closed state by a flip-latch. When the cover is unlocked, it automatically rotates back to the open state by reason of the spring 14 releasing its potential energy.

However, the cam 16 cannot engage steadily with the follower 18. In addition, when the cover is opened, the spring 14 is liable to drive the cover to impact the main housing. The impact may damage the cover, the main housing, or the hinge 10. Furthermore, the hinge 10 is complex and difficult to assemble.

What is needed, therefore, is a simple, stable hinge mechanism which can be operated steadily and safely.

SUMMARY

In a preferred embodiment, a hinge for joining the housings of a foldable electronic device together comprises an axle with a screw thread thereon, a clip at one end of the axle, a block with a screw hole therein and a spring around the axle. The block is retained on the axle with engagement of the screw thread in the screw hole, and the spring is retained between the clip and the block.

Another embodiment provides a foldable electronic device, which includes a main housing, a cover and the above-described hinge joining the main housing and the cover together. The foldable electronic device may, for example, be a foldable mobile phone.

The structure of the hinge is stable, by reason of the connection provided by the axle between the clip and the block. The mobile phone using the hinge can reduce or eliminate damaging impact that would otherwise occur when the cover is opened up from the main housing and reaches an open state.

Other advantages and novel features of the embodiments will become more apparent from the following detailed description when taken in conjunction with the accompanying drawings, in which:

DETAILED DESCRIPTION OF THE INVENTION

Figure 1:
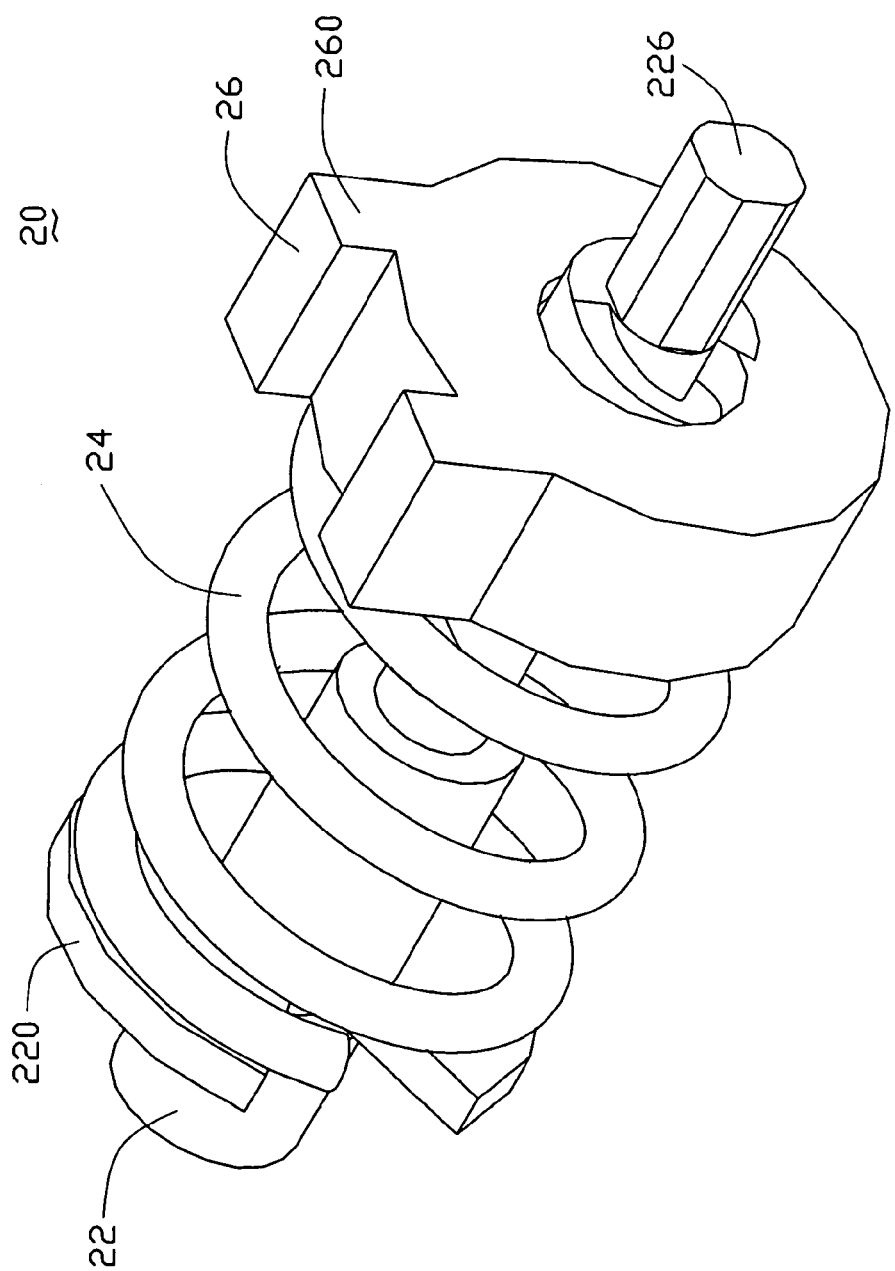
FIG. 1 is an isometric view of a hinge according to a preferred embodiment of the present invention, showing the hinge positioned corresponding to a closed position of a foldable electronic device.
Figure 1A:
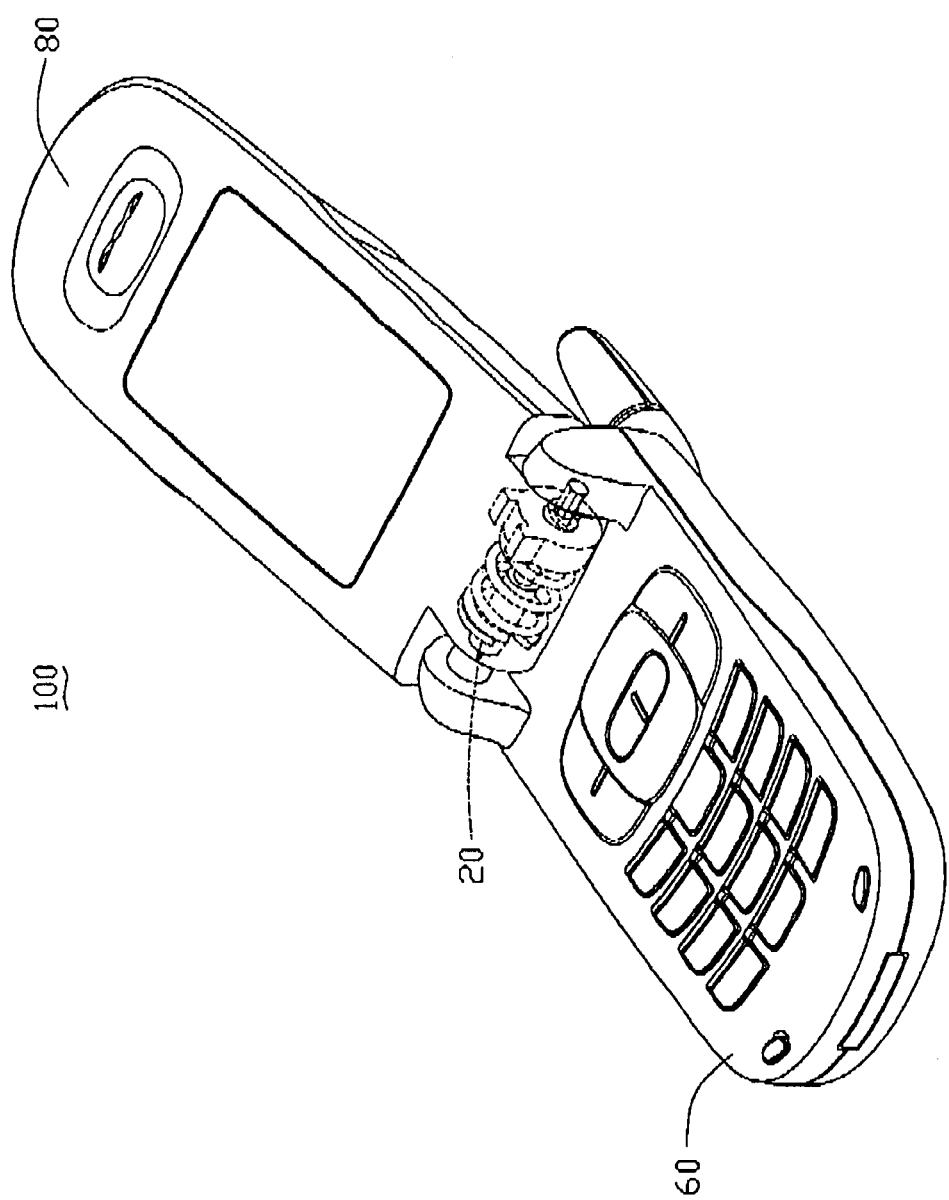
FIG. 1A is a schematic view of a foldable electronic device according to a preferred embodiment of the present invention.

Referring now to the drawings in detail, FIG. 1 and FIG. 1A show a hinge 20 of a hinge mechanism for joining a cover 80 to a main housing 60 of a foldable electronic device such as a foldable mobile phone 100. The hinge 20 includes a central part like an axle 22 extending along a central axis of the hinge 20, a clip 220 fixed on a first end of the axle 22, a spring 24, and a peripheral part like a block 26.

Figure 2:
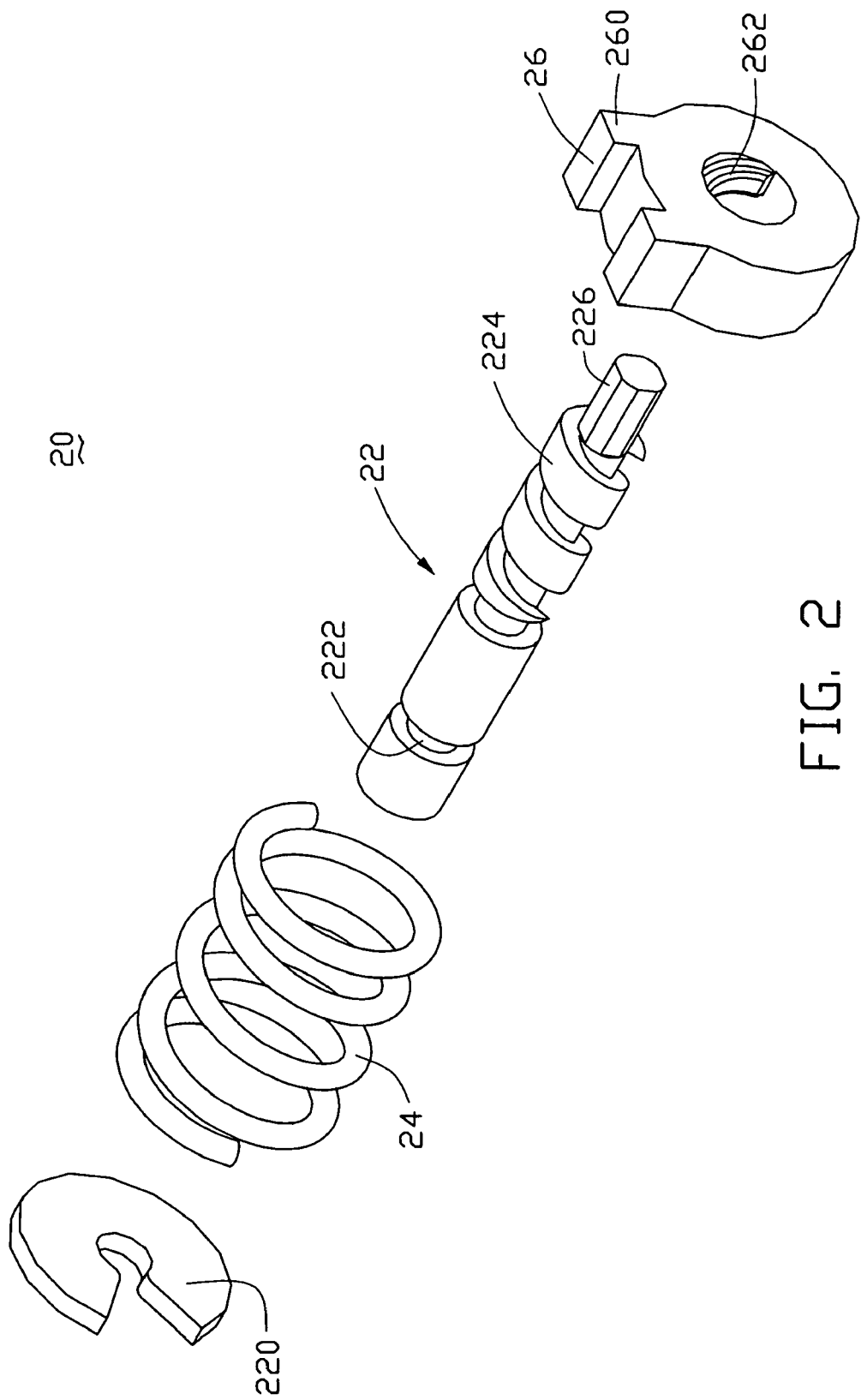
FIG. 2 is an exploded view of FIG. 1.
Figure 3:
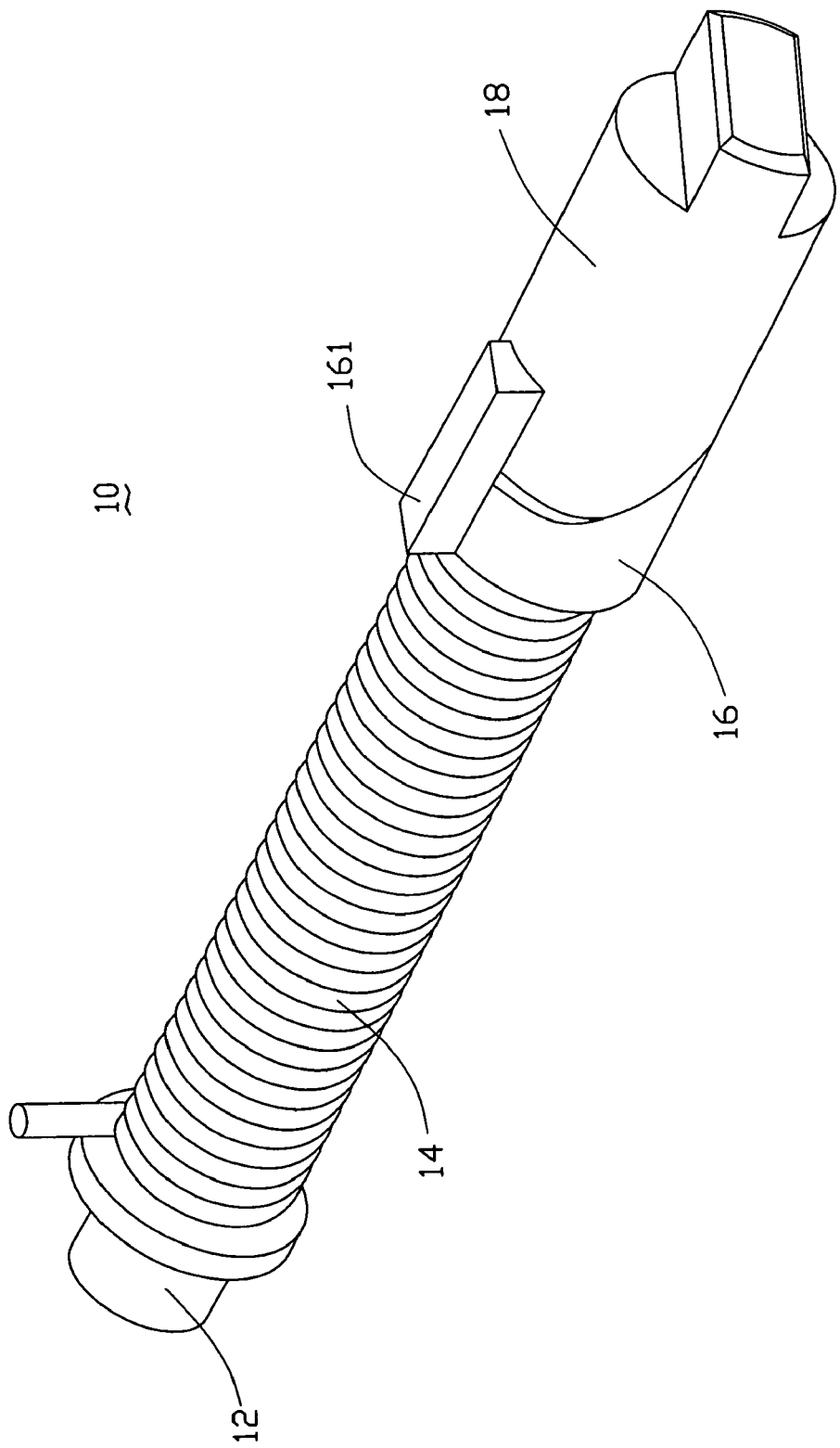
FIG. 3 is an isometric view of a conventional hinge.

Referring also to FIG. 2, a round groove 222 is defined in the first end of the axle 22, and a polygonal shaft 226 is formed on an opposite second end of the axle 22. A screw thread 224 is formed at an intermediate part of the axle 22. The clip 220 is C-shaped, and is fixed in the round groove 222. The spring 24 is retained between the clip 220 and the block 26. Two parallel knobs 260 are formed on a circumferential wall of the block 26. A screw hole 262 is defined in the block 26, for threadingly receiving the screw thread 224. Thus the block 26 is mounted on the axle 22, with the screw hole 262 engagingly receiving the screw thread 224. This helps ensure that the block 26 does not accidentally come off from the axle 22.

When the hinge 20 is used in the mobile phone 100, the axle 22 and the block 26 are respectively received in the cover 80 or the main housing 60 of the mobile phone 100. The following detailed description of movement of the hinge 20 assumes that the axle 22 is received in the cover 80, and the block 26 is received in the main housing 60.

The spring 24 keeps its original length when the cover 80 and the main housing 60 of the mobile phone 100 are in an open state. The polygonal shaft 226 of the axle 22 is received in the cover 80, and the knobs 260 of the block 26 are received in the main housing 60. When the cover 80 is rotated down toward the main housing 60, the axle 22 rotates clockwise relative to the block 26 (as viewed in FIG. 2). Because of the engagement of the screw thread 224 in the screw hole 262, the axle 22 draws the clip 220 toward the block 26. The distance between the block 26 and the clip 220 decreases, and the spring 24 is compressed. When the cover 80 reaches a closed state, it is locked thereat by a lock component (not shown) of the main housing 60. At this position, the compressed spring 24 retains a certain amount of elastic potential energy. When the lock component is unlocked, the compressed spring 24 immediately decompresses and releases its potential energy, and the cover automatically rotates to the fully open state.

In the process of the cover 80 opening, because of the engagement of the screw thread 224 in the screw hole 262 of the block 26, the decompression of the compressed spring 24 is slowed down. This helps prevent the cover 80 from impacting the main housing 60 when the cover 80 reaches the open state. In addition, the hinge 10 is steady and reliable, because the axle 22 is mounted substantially between the clip 220 and the block 26. Furthermore, the hinge 10 has relatively few components, making it simple and easy to manufacture.

In an alternative embodiment, opposite ends of the spring 24 can be formed such that they are fixed to the clip 220 and the block 26 respectively. The clip 220 can be rotatably fixed in the round groove 222. With this configuration, if the cover opens too far relative to the main housing, the distance between the clip 220 and the block 26 increases too much, and the spring 24 is overstretched. Thus, the spring 24 rebounds and draws the clip 220 back toward the block 26. That is, the spring 24 corrects the overstretching, and helps bring the cover to the correct position at the open state.

In another alternative embodiment, the clip 220 is fixed in the round groove 222, and a first end of the spring 24 can be fixed to the clip 220, with an opposite second end of the spring 24 being fixed to the block 26. In a further alternative embodiment, the clip 220 can be omitted, and the first end of the spring 24 can be directly fixed to the first end of the axle 22, with the second end of the spring 24 being fixed to the block 26. With either of these configurations, the spring 24 can acquire more potential energy when the cover is rotated down to the closed state. Furthermore, the spring 24 can be replaced by another kind of suitable elastic member such as a resilient cylinder.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A foldable electronic device comprising:

a main housing enclosing parts of said foldable electronic device;

a cover enclosing other parts of said foldable electronic device and disposed next to said housing so as to be rotatably movable relative to said housing between a first position where a side of said housing is covered by said cover, and a second position where said side of said housing is revealed from said cover; and a hinge mechanism interconnecting said housing with said cover so as to allow movement of said cover relative to said housing between said first position and said second position thereof, said hinge mechanism comprising a central part engagably movable together with one of said housing and said cover, a peripheral part engagably movable together with the other of said housing and said cover, and an elastic member, said peripheral part formed surrounding said central part and movably engagable with said central part, one end of said elastic member abutting said central part and another end of said elastic member abutting said peripheral part, wherein when said peripheral part is moved to compress said elastic member, engagement of said peripheral part and said central part enables rotational movement and axial movement of said peripheral part along said central part so as to guide said movement of said cover to said first position, and when said peripheral part is released, said peripheral part is automatically moved to drive said cover to said second position due to decompression of said elastic member.

2. The foldable electronic device as claimed in claim 1, wherein said central part is an axle extending along interconnection portions of said housing and said cover.

3. The foldable electronic device as claimed in claim 2, wherein said peripheral part is a block with said axle extending therethrough.

4. The foldable electronic device as claimed in claim 1, wherein said engagement of said central part and said peripheral part is performed by screw threads formed on said central part and a screw hole formed in said peripheral part.

5. A foldable electronic device comprising:

a main housing enclosing parts of said foldable electronic device;

a cover enclosing other parts of said foldable electronic device and disposed next to said housing so as to be rotatably movable relative to said housing between a first position where a side of said housing is covered by said cover, and a second position where said side of said housing is revealed from said cover; and a hinge mechanism interconnecting said housing with said cover so as to allow movement of said cover relative to said housing between said first position and said second position thereof, said hinge mechanism comprising a first part engagably movable together with one of said housing and said cover, a second part engagably movable together with the other of said housing and said cover, and an elastic member, one of said first and second parts formed at a radial location away from a central axis of said hinge mechanism and capable of rotational movement about said central axis and axial movement along said central axis by means of being movably engagable with the other of said first and second parts, one end of said elastic member abutting said first part and another end of said elastic member abutting said second part, wherein when said first part is moved to drive said cover to said first position, said elastic member is compressed, and when said first part is released, the movable engagement between said first part and said second part enabling said cover to automatically move to said second position due to decompression of said elastic member.

6. The foldable electronic device as claimed in claim 5, wherein said first part is an axle extending along said central axis of said hinge mechanism.

7. The foldable electronic device as claimed in claim 6, wherein said second part is a block with a hole where said axle extends therethrough.

8. The foldable electronic device as claimed in claim 5, wherein movable engagement of said first and second parts is performed by screw threads formed on said first part and a screw hole formed in said second part.

* * * * *